US012526460B2

(12) United States Patent
Chen

(10) Patent No.: US 12,526,460 B2
(45) Date of Patent: Jan. 13, 2026

(54) VIDEO GENERATION METHOD AND APPARATUS, AND DEVICE AND STORAGE MEDIUM

(71) Applicant: Beijing Bytedance Network Technology Co., Ltd., Beijing (CN)

(72) Inventor: Yixin Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 55 days.

(21) Appl. No.: 18/715,068

(22) PCT Filed: Nov. 29, 2022

(86) PCT No.: PCT/CN2022/134957
§ 371 (c)(1),
(2) Date: May 30, 2024

(87) PCT Pub. No.: WO2023/098649
PCT Pub. Date: Jun. 8, 2023

(65) Prior Publication Data
US 2025/0024088 A1 Jan. 16, 2025

(30) Foreign Application Priority Data
Nov. 30, 2021 (CN) .......................... 202111444204.0

(51) Int. Cl.
*H04N 21/234* (2011.01)
*G06T 3/40* (2006.01)
(Continued)

(52) U.S. Cl.
CPC ......... *H04N 21/23424* (2013.01); *G06T 3/40* (2013.01); *G06T 3/60* (2013.01);
(Continued)

(58) Field of Classification Search
CPC ....... H04N 21/23424; H04N 21/23412; H04N 21/44016; G06T 7/194
See application file for complete search history.

(56) References Cited

U.S. PATENT DOCUMENTS 10,902,551 B1 * 1/2021 Mellado Bataller .... G06T 7/194
2019/0026917 A1 * 1/2019 Liao ....................... G06V 10/82
(Continued)

FOREIGN PATENT DOCUMENTS

CN 110290425 A 9/2019
CN 111145192 A 5/2020
(Continued)

OTHER PUBLICATIONS

International Search Report for PCT/CN2022/134957, mailed Jan. 19, 2023, 3 pages.
(Continued)

Primary Examiner — Joshua D Taylor
(74) Attorney, Agent, or Firm — Astute IP Law Group

(57) ABSTRACT

Embodiments of the present disclosure disclose a video generation method and apparatus, a device, and a storage medium. The method includes: obtaining a video frame contained in a video to be processed, where the video to be processed contains a portrait; performing portrait segmentation on the video frame to obtain a portrait image and a background image; adjusting transparency of pixels that meet a defined condition in the portrait image to obtain the adjusted portrait image; processing the background image to obtain an entire background image; fusing the adjusted portrait image and the entire background image to obtain a portrait video frame; and stitching a plurality of portrait video frames to obtain a target video.

12 Claims, 2 Drawing Sheets

(51) Int. Cl.
*G06T 3/60* (2006.01)
*G06T 5/50* (2006.01)
*G06T 7/194* (2017.01)

(52) U.S. Cl.
CPC ............... *G06T 5/50* (2013.01); *G06T 7/194* (2017.01); *G06T 2207/20221* (2013.01)

(56) References Cited

U.S. PATENT DOCUMENTS

| | | |
|---|---|---|
| 2019/0182436 A1 | 6/2019 | Gupta et al. |
| 2021/0203859 A1 | 7/2021 | Zhu |
| 2021/0304452 A1 | 9/2021 | Lee |
| 2022/0130174 A1* | 4/2022 | Tani .................. G06V 40/20 |

FOREIGN PATENT DOCUMENTS

| | | |
|---|---|---|
| CN | 111292337 A | 6/2020 |
| CN | 111556278 A | 8/2020 |
| CN | 111695105 A | 9/2020 |
| CN | 111815649 A | 10/2020 |
| CN | 112308866 A | 2/2021 |
| CN | 112351291 A | 2/2021 |
| CN | 112637517 A | 4/2021 |
| CN | 113014830 A | 6/2021 |
| CN | 113132795 A | 7/2021 |
| CN | 113362365 A | 9/2021 |
| CN | 114040129 A | 2/2022 |
| WO | 2018002533 A1 | 1/2018 |
| WO | 2018149175 A1 | 8/2018 |
| WO | 2020179052 A1 | 9/2020 |
| WO | 2020228406 A1 | 11/2020 |
| WO | 2021169851 A1 | 9/2021 |
| WO | 2021203996 A1 | 10/2021 |

OTHER PUBLICATIONS

Search Report for Chinese Patent Application No. 202111444204.0, mailed on Apr. 28, 2023, 2 pages.
Supplemental Search Report for Chinese Patent Application No. 202111444204.0, 1 page.

* cited by examiner

VIDEO GENERATION METHOD AND APPARATUS, AND DEVICE AND STORAGE MEDIUM

The present application is a national stage application filed under 35 U.S.C. 371 based on International Patent Application No. PCT/CN2022/134957, filed Nov. 29, 2022, which claims priority to Chinese Patent Application No. 202111444204.0, filed with the China National Intellectual Property Administration on Nov. 30, 2021, which are is-incorporated herein by reference in their entireties.

TECHNICAL FIELD

Embodiments of the present disclosure relate to the field of image processing technologies, and for example, to a video generation method and apparatus, a device, and a storage medium.

BACKGROUND ART

In recent years, short video apps have developed rapidly, entering users' lives and gradually enriching their spare time. The users may record their lives by means of videos, photos, etc., which may be reprocessed using effect technologies, such as beauty, style, expression editing, etc., provided on the short video apps for presentation in richer forms.

SUMMARY OF THE INVENTION

Embodiments of the present disclosure provide a video generation method and apparatus, a device, and a storage medium, which may perform effect processing of hiding a portrait in an acquired video, thereby making the video generated more interesting.

According to a first aspect, an embodiment of the present disclosure provides a video generation method. The method includes:
  obtaining a video frame contained in a video to be processed, where the video to be processed contains a portrait;
  performing portrait segmentation on the video frame to obtain a portrait image and a background image;
  adjusting transparency of pixels that meet a defined condition in the portrait image to obtain the adjusted portrait image;
  processing the background image to obtain an entire background image;
  fusing the adjusted portrait image and the entire background image to obtain a portrait video frame; and
  stitching a plurality of portrait video frames to obtain a target video.

According to a second aspect, an embodiment of the present disclosure further provides a video generation apparatus. The apparatus includes:
  a video frame obtaining module configured to obtain a video frame contained in a video to be processed, where the video to be processed contains a portrait;
  a portrait segmentation module configured to perform portrait segmentation on the video frame to obtain a portrait image and a background image;
  a portrait image adjustment module configured to adjust transparency of pixels that meet a defined condition in the portrait image to obtain the adjusted portrait image;
  an entire background image obtaining module configured to process the background image to obtain an entire background image;
  a portrait video frame obtaining module configured to fuse the adjusted portrait image and the entire background image to obtain a portrait video frame; and
  a target video obtaining module configured to stitch a plurality of portrait video frames to obtain a target video.

According to a third aspect, an embodiment of the present disclosure further provides an electronic device. The electronic device includes: at least one processing apparatus; and
  a storage apparatus configured to store at least one program, where
  the at least one program, when executed by the at least one processing apparatus, causes the at least one processing apparatus to implement the video generation method according to the embodiment of the present disclosure.

According to a fourth aspect, an embodiment of the present disclosure further provides a computer-readable medium having stored thereon a computer program that, when executed by a processing apparatus, causes the video generation method according to the embodiment of the present disclosure to be implemented.

DETAILED DESCRIPTION OF THE INVENTION

Embodiments of the present disclosure are described in more detail below with reference to the accompanying drawings.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "at least one".

The names of messages or information exchanged between a plurality of apparatuses in the implementations of the present disclosure are used for illustrative purposes only, and are not used to limit the scope of these messages or information.

Figure 1:
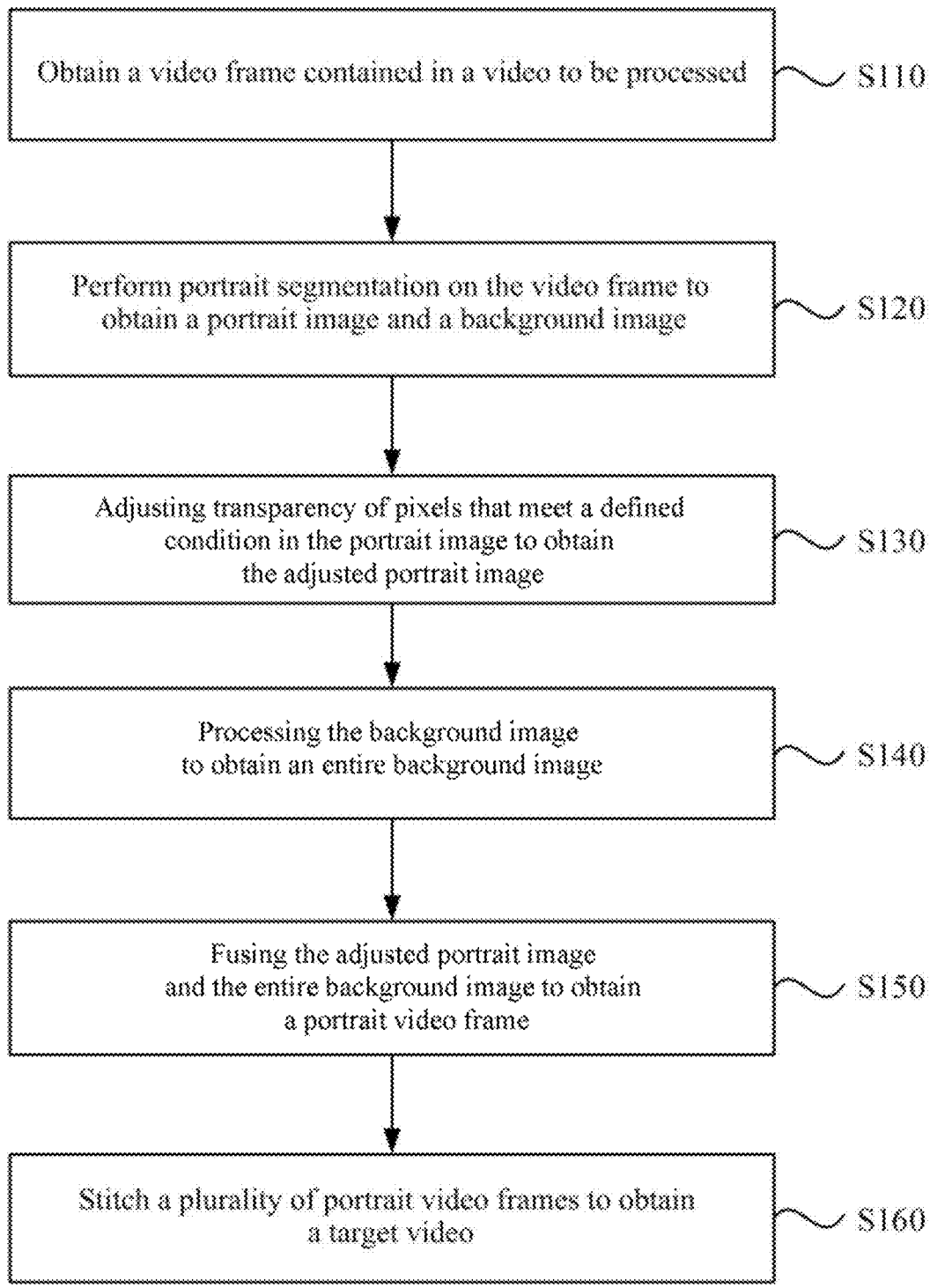
FIG. 1 is a flowchart of a video generation method according to an embodiment of the present disclosure.

FIG. 1 is a flowchart of a video generation method according to an embodiment of the present disclosure. This embodiment is applicable to a cases of achieving a hiding effect on a portrait in a video frame. The method may be performed by a video generation apparatus. The apparatus may be composed of hardware and/or software, and may generally be integrated in a device having a video generation function. The device may be an electronic device such as a server, a mobile terminal, or a server cluster. As shown in FIG. 1, the method includes the following steps.

Step 110: Obtain a video frame contained in a video to be processed.

The video to be processed contains a portrait. The portrait may be understood as an image that contains part or all of a human body. The video to be processed may be downloaded from a local database or a server-side database, or pre-recorded by using a camera of a terminal, or acquired in real time by using a camera of a terminal. If the video to be processed is downloaded from the local database or the server-side database, it is necessary to perform frame split processing on the video to be processed, to obtain the video frame contained in the video to be processed. If the video to be processed is acquired in real time, a video frame acquired in real time by the camera is directly obtained. In this embodiment, video frame extraction may be performed on the video to be processed at a preset interval. For example, it is possible to extract each video frame from the video to be processed, or to extract one video frame every N video frames.

Step 120: Perform portrait segmentation on the video frame to obtain a portrait image and a background image.

The principle of performing the portrait segmentation on the video frame may be first recognizing a portrait in the video frame, and then performing matting on the recognized portrait, thereby obtaining the portrait image and the background image with the portrait removed.

For example, to obtain the portrait image and the background image, the portrait segmentation may be performed on each video frame by: performing portrait recognition on each video frame to obtain a portrait mask image and a background mask image; obtaining the portrait image based on the portrait mask image and the video frame; and obtaining the background image based on the background mask image and the video frame.

The portrait mask image may be understood as a mask with a portrait region transparent and a background region in black. The background mask image may be understood as a mask with the background region transparent and the portrait region in black. The process of performing the portrait segmentation on each video frame may be inputting the video frame into a semantic recognition model to obtain a confidence level of each pixel in the video frame that belongs to the portrait, determining a grayscale value of the pixel based on the confidence level, to obtain a mask map, and finally obtaining the portrait mask image and the background mask image based on the mask map. The mask map is a grayscale image in which a white region is the portrait region and a black region is the background region.

In this embodiment, the process of obtaining the portrait image based on the portrait mask image and the video frame may be creating a new layer (or referred to as a patch), and superimposing, on this layer, the portrait mask image on the video frame to occlude the background region, thereby obtaining the portrait image. Likewise, the process of obtaining the background image based on the background mask image and the video frame may be superimposing the background mask image on the video frame to occlude the portrait region, thereby obtaining the background image. In this embodiment, obtaining the portrait image and the background image based on the portrait mask image and the background mask image may increase the precision of the portrait image and the background image.

Step 130: Adjust transparency of pixels that meet a defined condition in the portrait image to obtain the adjusted portrait image.

The defined condition may be that a color value of pixels is greater than or less than a set value, or that a distance of the pixel from a center point of the video frame is greater than or less than the set value. In addition, the set value is related to a moment of the video frame in the video to be processed. The transparency may be adjusted by reducing the transparency of the pixels by a set ratio, for example, adjusting the transparency to ½ or ⅕ of the original transparency, or by any ratio. In this embodiment, the transparency may be directly adjusted to 0, to achieve the effect of hiding the pixel. For example, if the defined condition is that the distance of the pixel from the center point of the video frame is greater than the set value, the set value may decrease as timestamps increase, so that the hiding effect on the generated video is that the portrait is gradually hidden from outside to inside. Alternatively, the set value may first decrease and then increase as timestamps increase, so that the hiding effect on the generated video is that the portrait is first hidden from outside to inside, and then displayed from inside to outside. If the defined condition is that the distance of the pixel from the center point of the video frame is less than the set value, the set value may increase as timestamps increase, so that the effect on the generated video is that the portrait is gradually hidden from inside to outside. Alternatively, the set value may first increase and then decrease as timestamps increase, so that the effect on the generated video is that the portrait is first hidden from inside to outside, and then displayed from outside to inside. In this embodiment, the set value is related to the timestamp of the video frame, such that the portrait in the generated video presents the effect of being gradually hidden, thereby making the video more interesting.

In this embodiment, the pixel may be hidden by hiding the shading for the pixel, making the pixel appear transparent.

Optionally, to obtain the adjusted portrait image, the transparency of the pixels that meet the defined condition in the portrait image may alternatively be adjusted by: making at least one copy of the portrait image to obtain at least one portrait image copy; rotating the at least one portrait image copy about a coordinate axis of a three-dimensional space by a set angle to obtain the rotated portrait image copy, where the portrait image and the at least one rotated portrait image copy form a portrait image group; and adjusting transparency of pixels that meet the defined condition in the portrait image group to obtain the adjusted portrait image group.

The at least one copy of the portrait image may be made by creating at least one new layer, and placing the portrait image on the new layer to obtain the at least one portrait image copy. The coordinate axis of the three-dimensional space may be an x axis or a y axis, and the set angle may be any value from 10 degrees to 90 degrees.

If there are a plurality of portrait image copies, to prevent the rotated portrait image copies overlapped each other, the plurality of portrait image copies rotate about different coordinate axes, or by different rotation angles. For example, assuming that two copies of the portrait image are made, and therefore, two portrait image copies are obtained, where one is rotated about the x axis by 70 degrees, and the other is rotated about the y axis by 70 degrees.

For example, after the portrait image group is obtained, for each portrait image in the portrait image group, the transparency of pixels with a distance from the center point of the video frame greater than or less than the set value is adjusted to obtain the adjusted portrait image group. In this embodiment, a plurality of copies of the portrait image are made, and the transparency of a plurality of portrait images is adjusted simultaneously, which may present a effect of "teleportation", thereby making the video more interesting.

Optionally, after the adjusted portrait image group is obtained, the method further includes the following steps: determining a rotation percentage for each pixel in the adjusted portrait image group based on a distance of the pixel from a center point of the video frame; determining a rotation parameter of the pixel based on the rotation percentage and the set rotation angle; and rotating the pixel according to the rotation parameter.

The set rotation angle is related to the timestamp of the video frame. In this embodiment, the set rotation angle may increase with the moment of the video frame from earlier to later in the video to be processed, until the portrait is fully hidden. The rotation percentage may be determined based on the distance of the pixel from the center point of the video frame according to the following formula: $p=(0.9-d)/0.9$, where p is the rotation percentage, and d is the distance of the pixel from the center point of the video frame.

The rotation parameter includes a first sub-rotation parameter and a second sub-rotation parameter. The rotation parameter of the pixel may be determined based on the rotation percentage and the set rotation angle by: determining an intermediate rotation angle based on the rotation percentage and the set rotation angle; and using a sine value of the intermediate rotation angle as a first sub-rotation parameter, and a cosine value of the intermediate rotation angle as a second sub-rotation parameter.

The intermediate rotation angle may be determined based on the rotation percentage and the set rotation angle according to the following formula: $\theta=p*percent*angle*8.0$, where angle is the set rotation angle; percent is a set percentage, which may be a set value; and p is the rotation percentage. Therefore, the first sub-rotation parameter is $s=\sin\theta$, and the second sub-rotation parameter is $c=\cos\theta$.

Accordingly, the pixel may be rotated and shifted according to the rotation parameter by: determining coordinate information of the rotated pixel based on the first sub-rotation parameter and the second sub-rotation parameter.

For example, the coordinate information of the rotated pixel may be determined based on the first sub-rotation parameter and the second sub-rotation parameter according to the following formula: $(x2, y2)=(x1*c-y1*s, x1*s+y1*c)$, where $(x1,y1)$ is coordinate information of the pixel before rotation, and $(x2,y2)$ is the coordinate information of the rotated pixel. In this embodiment, through the determination of the coordinate information of the rotated pixel based on the first sub-rotation parameter and the second sub-rotation parameter, a position of the rotated pixel can be accurately determined.

In this embodiment, if the portrait image is not copied, that is, there is only one portrait image, the following steps can still be performed: determining a rotation percentage for each pixel in the portrait image based on a distance of the pixel from a center point of the video frame; determining a rotation parameter of the pixel based on the rotation percentage and the set rotation angle, where the set rotation angle is related to the timestamp of the video frame; and rotating the pixel according to the rotation parameter.

In this embodiment, the pixel in the portrait image of a current frame or in the adjusted portrait image group is rotated according to the rotation parameter, which may cause the portrait in the video to have both a change in the transparency and a effect of rotation, thereby making the video more interesting.

Optionally, after the adjusted portrait image group is obtained, the method further includes the following steps: scaling at least one portrait image in the adjusted portrait image group by a set ratio to obtain the scaled portrait image group.

The set ratio may be set to any value from 50% to 90%. Assuming that the set ratio is 70%, the portrait in the current video frame is scaled to 70% of the portrait in a previous frame. In this embodiment, during scaling of portrait images in the adjusted portrait image group, at least one portrait image may be selected randomly for scaling, which is not limited here. In other words, all portrait images in the portrait image group may be scaled, or several of them may be selected for scaling. In this embodiment, the at least one portrait image in the portrait image group is scaled, which may cause the portrait in the video to present an effect of a dynamic change in size.

Step 140: Process the background image to obtain an entire background image.

The background image is a background image with the portrait region removed, and therefore, the background image needs to be inpainted. In this embodiment, the background image may be processed using a set inpainting algorithm.

For example, to obtain the entire background image, the background image may be processed by: obtaining optical flow information of a background image of a first video frame of the video to be processed or a background image of a previous video frame of the video frame; and processing the optical flow information using a set inpainting algorithm, to obtain the entire background image of the video frame.

The optical flow information may be obtained by inputting the video frame into an optical flow information determination model. In this embodiment, any method in the related art for obtaining the optical flow information may be used, which is not limited here. After the optical flow information is obtained, the optical flow information is processed by using the set inpainting algorithm, to obtain the entire background image of the video frame.

In this embodiment, the optical flow information of the background image of the first video frame may be used to inpaint a background image of each subsequent video frame. The benefit of this is that a number of times the optical flow information is extracted may be reduced, thereby reducing an amount of computation, and improving the efficiency of the entire video generation process. Alternatively, the optical flow information of the previous video frame may be used to inpaint the background image of the current video frame. The benefit of this is that the precision of inpainting the background image may be increased.

Step 150: Fuse the adjusted portrait image and the entire background image to obtain a portrait video frame.

In this embodiment, if there is only one portrait image, the portrait image is superimposed on the entire background image to obtain the portrait video frame. If the portrait image is copied, and the portrait image group is obtained, the portrait image group and the entire background image are fused to obtain the portrait video frame. If the pixel in the portrait image is rotated, the rotated portrait image group and the entire background image are fused to obtain the portrait video frame. If the portrait image is scaled, the scaled portrait image group and the entire background image are fused to obtain the portrait video frame.

Step 160: Stitch a plurality of portrait video frames to obtain a target video.

In this embodiment, the transparency of the portrait in each video frame extracted from the video to be processed is adjusted according to the embodiment described above, to obtain the plurality of the portrait video frames, and the plurality of the portrait video frames are stitched and encoded to obtain the target video.

Optionally, the transparency of the pixels that meet the defined condition in the portrait image may be directly adjusted to 0, to achieve the effect of hiding the pixel. For example, the pixel that meet the defined condition in the portrait image group is hidden to obtain the hidden-portrait image group (in which at least one portrait image may be contained). The pixel in the hidden-portrait image group is then rotated according to the determined rotation parameter, to obtain the rotated hidden-portrait image group. At least one portrait image in the rotated hidden-portrait image group is then scaled by the set ratio to obtain the scaled hidden-portrait image group. The scaled hidden-portrait image group and the entire background image are then fused to obtain a hidden-portrait video frame. Finally, the hidden-portrait video frames are stitched to obtain the target video. In this embodiment, the generated target video presents an effect that the portrait is gradually hidden.

In the technical solution of this embodiment of the present disclosure, the video frame contained in the video to be processed is obtained, where the video to be processed contains the portrait; portrait segmentation is performed on the video frame to obtain the portrait image and the background image; transparency of the pixels that meet the defined condition in the portrait image is adjusted to obtain the adjusted portrait image; the background image is processed to obtain the entire background image; the adjusted portrait image and the entire background image are fused to obtain the portrait video frame; and the plurality of portrait video frames are stitched to obtain the target video. According to the video generation method provided in this embodiment of the present disclosure, the transparency of the pixels that meet the defined condition in the portrait image is adjusted, which can perform effect processing of hiding a portrait in an acquired video, thereby making the video generated more interesting.

Figure 2:
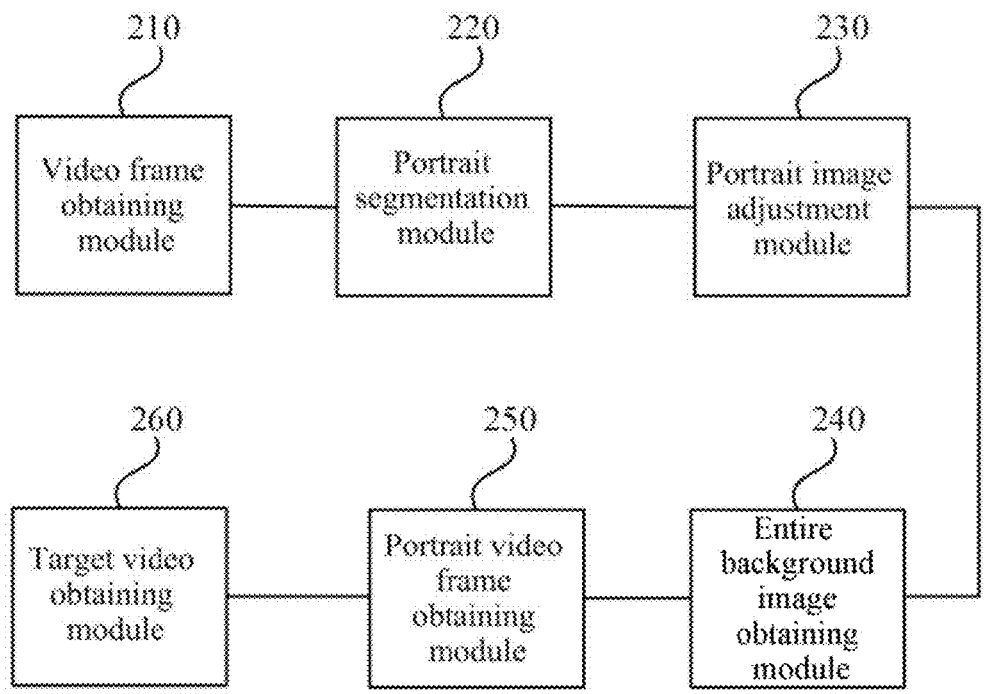
FIG. 2 is a schematic diagram of a structure of a video generation apparatus according to an embodiment of the present disclosure.

FIG. 2 is a schematic diagram of a structure of a video generation apparatus according to an embodiment of the present disclosure. As shown in FIG. 2, the apparatus includes:
a video frame obtaining module 210 configured to obtain a video frame contained in a video to be processed, where the video to be processed contains a portrait;
a portrait segmentation module 220 configured to perform portrait segmentation on the video frame to obtain a portrait image and a background image;
a portrait image adjustment module 230 configured to adjust transparency of pixels that meet a defined condition in the portrait image to obtain the adjusted portrait image;
an entire background image obtaining module 240 configured to process the background image to obtain an entire background image;
a portrait video frame obtaining module 250 configured to fuse the adjusted portrait image and the entire background image to obtain a portrait video frame; and
a target video obtaining module 260 configured to stitch a plurality of portrait video frames to obtain a target video.

Optionally, the portrait segmentation module 220 is further configured to:
perform portrait recognition on each video frame to obtain a portrait mask image and a background mask image;
obtain the portrait image based on the portrait mask image and the video frame; and
obtain the background image based on the background mask image and the video frame.

Optionally, the portrait image adjustment module 230 is further configured to: make at least one copy of the portrait image to obtain at least one portrait image copy; rotate the at least one portrait image copy about a coordinate axis of a three-dimensional space by a set angle to obtain the rotated portrait image copy, where the portrait image and the at least one rotated portrait image copy form a portrait image group; and adjust transparency of pixels that meet the defined condition in the portrait image group to obtain the adjusted portrait image group.

Optionally, the portrait video frame obtaining module 250 is further configured to: fuse the adjusted portrait image group and the entire background image to obtain the portrait video frame.

Optionally, the apparatus further includes a rotation module configured to:
determine a rotation percentage for each pixel in the adjusted portrait image group based on a distance of the pixel from a center point of the video frame;
determine a rotation parameter of the pixel based on the rotation percentage and the set rotation angle, where the set rotation angle is related to a timestamp of the video frame; and
rotate the pixel according to the rotation parameter.

Optionally, the rotation module is further configured to:
determine an intermediate rotation angle based on the rotation percentage and the set rotation angle; and
use a sine value of the intermediate rotation angle as a first sub-rotation parameter, and a cosine value of the intermediate rotation angle as a second sub-rotation parameter.

Rotating and shifting the pixel according to the rotation parameter includes:
determining coordinate information of the rotated pixel based on the first sub-rotation parameter and the second sub-rotation parameter.

Optionally, the apparatus further includes a scaling module configured to:
scale at least one portrait image in the adjusted portrait image group by a set ratio to obtain the scaled portrait image group.

Optionally, the entire background image obtaining module 240 is further configured to: obtain optical flow information of a background image of a first video frame of the video to be processed or a background image of a previous video frame of the video frame; and process the optical flow information using a set inpainting algorithm, to obtain the entire background image of the video frame.

Optionally, the defined condition is that a distance of pixels from a center point of the video frame is greater than or less than a set value, where the set value is related to the timestamp of the video frame.

The apparatus described above can perform the method provided in all the above embodiments of the present disclosure, and has corresponding functional modules for performing the method described above. For the technical details not described in detail in this embodiment, reference may be made to the method provided in all the above embodiments of the present disclosure.

Figure 3:
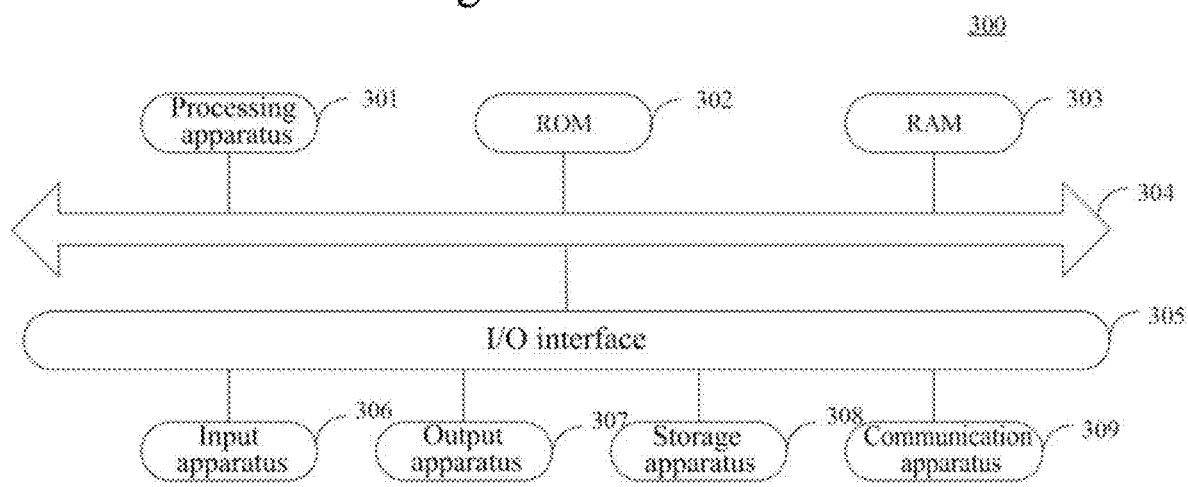
FIG. 3 is a schematic diagram of a structure of an electronic device according to an embodiment of the present disclosure.

Reference is made to FIG. 3 below, which is a schematic diagram of a structure of an electronic device 300 suitable for implementing the embodiments of the present disclosure. The electronic device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital television (TV) and a desktop computer, or various forms of servers such as a separate server or a server cluster. The electronic device shown in FIG. 3 is merely an example, and shall not impose any limitation on the function and scope of use of the embodiments of the present disclosure.

As shown in FIG. 3, the electronic device 300 may include a processing apparatus (e.g., a central processing unit, a graphics processing unit, etc.) 301 that may perform a variety of appropriate actions and processing in accordance with a program stored in a read-only memory (ROM) 302 or a program loaded from a storage apparatus 305 into a random access memory (RAM) 303. The RAM 303 further stores various programs and data required for the operation of the electronic device 300. The processing apparatus 301, the ROM 302, and the RAM 303 are connected to each other through a bus 304. An input/output (I/O) interface 305 is also connected to the bus 304.

Generally, the following apparatuses may be connected to the I/O interface 305: an input apparatus 306 including, for example, a touch screen, a touchpad, a keyboard, a mouse, a camera, a microphone, an accelerometer, and a gyroscope; an output apparatus 307 including, for example, a liquid crystal display (LCD), a speaker, and a vibrator; a storage apparatus 308 including, for example, a tape and a hard disk; and a communication apparatus 309. The communication apparatus 309 may allow the electronic device 300 to perform wireless or wired communication with other devices to exchange data. Although FIG. 3 shows the electronic device 300 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a computer-readable medium, where the computer program includes program code for performing the word recommendation method. In such an embodiment, the computer program may be downloaded from a network through the communication apparatus 309 and installed, installed from the storage apparatus 305, or installed from the ROM 302. When the computer program is executed by the processing apparatus 301, the above-mentioned functions defined in the method of the embodiment of the present disclosure are performed.

It should be noted that the above computer-readable medium described in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having at least one wire, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server can communicate using any currently known or future-developed network protocol such as a HyperText Transfer Protocol (HTTP), and can be connected to digital data communication (for example, communication network) in any form or medium. Examples of the communication network include a local area network (LAN), a wide area network (WAN), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries at least one program, and the at least one program, when executed by the electronic device, causes the electronic device to: obtain a video frame contained in a video to be processed, where the video to be processed contains a portrait; perform portrait segmentation on the video frame to obtain a portrait image and a background image; adjusting transparency of pixels that meet a defined condition in the portrait image to obtain the adjusted portrait image; process the background image to obtain an entire background image; fuse the adjusted portrait image and the entire background image to obtain a portrait video frame; and stitch a plurality of portrait video frames to obtain a target video.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be entirely executed on a computer of a user, partially executed on a computer of a user, executed as an independent software package, partially executed on a computer of a user and partially executed on a remote computer, or entirely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains at least one executable instruction for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. The name of a unit does not constitute a limitation on the unit itself under certain circumstances.

The functions described herein above may be performed at least partially by at least one hardware logic component. For example, without limitation, exemplary types of hardware logic components that may be used include: a field programmable gate array (FPGA), an application specific integrated circuit (ASIC), an application specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. A machine-readable medium may be a machine-readable signal medium or a machine-readable storage medium. A machine-readable medium may include, but is not limited to, electronic, magnetic, optical, electromagnetic, infrared, or semiconductor systems, apparatus, or devices, or any suitable combination thereof. More specific examples of a machine-readable storage medium may include an electrical connection based on at least one wire, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

According to at least one embodiment of the present disclosure, the embodiment of the present disclosure discloses a video generation method. The method includes:
obtaining a video frame contained in a video to be processed, where the video to be processed contains a portrait;
performing portrait segmentation on the video frame to obtain a portrait image and a background image;
adjusting transparency of pixels that meet a defined condition in the portrait image to obtain the adjusted portrait image;
processing the background image to obtain an entire background image;
fusing the adjusted portrait image and the entire background image to obtain a portrait video frame; and
stitching a plurality of portrait video frames to obtain a target video.

Optionally, performing portrait segmentation on each video frame to obtain the portrait image and the background image includes:
performing portrait recognition on each video frame to obtain a portrait mask image and a background mask image;
obtaining the portrait image based on the portrait mask image and the video frame; and
obtaining the background image based on the background mask image and the video frame.

Optionally, adjusting the transparency of the pixels that meet the defined condition in the portrait image to obtain the adjusted portrait image includes:
making at least one copy of the portrait image to obtain at least one portrait image copy;
rotating the at least one portrait image copy about a coordinate axis of a three-dimensional space by a set angle to obtain the rotated portrait image copy, where the portrait image and the at least one rotated portrait image copy form a portrait image group; and
adjusting transparency of pixels that meet the defined condition in the portrait image group to obtain the adjusted portrait image group.

Fusing the adjusted portrait image and the entire background image to obtain the portrait video frame includes:
fusing the adjusted portrait image group and the entire background image to obtain the portrait video frame.

Optionally, after the adjusted portrait image group is obtained, the method further includes:
determining a rotation percentage for each pixel in the adjusted portrait image group based on a distance of the pixel from a center point of the video frame;
determining a rotation parameter of the pixel based on the rotation percentage and the set rotation angle, where the set rotation angle is related to a timestamp of the video frame; and
rotating the pixel according to the rotation parameter.

Optionally, determining the rotation parameter of the pixel based on the rotation percentage and the set rotation angle includes:
determining an intermediate rotation angle based on the rotation percentage and the set rotation angle; and
using a sine value of the intermediate rotation angle as a first sub-rotation parameter, and a cosine value of the intermediate rotation angle as a second sub-rotation parameter; and rotating and shifting the pixel according to the rotation parameter includes:
  determining coordinate information of the rotated pixel based on the first sub-rotation parameter and the second sub-rotation parameter.

Optionally, after the adjusted portrait image group is obtained, the method further includes:
  scaling at least one portrait image in the adjusted portrait image group by a set ratio to obtain the scaled portrait image group.

Optionally, processing the background image to obtain the entire background image includes:
  obtaining optical flow information of a background image of a first video frame of the video to be processed or a background image of a previous video frame of the video frame; and
  processing the optical flow information using a set inpainting algorithm, to obtain the entire background image of the video frame.

Optionally, the defined condition is that a distance of pixels from a center point of the video frame is greater than or less than a set value, where the set value is related to the timestamp of the video frame.

According to at least one embodiment of the present disclosure, the embodiment of the present disclosure discloses a video generation apparatus. The apparatus includes:
  a video frame obtaining module configured to obtain a video frame contained in a video to be processed, where the video to be processed contains a portrait;
  a portrait segmentation module configured to perform portrait segmentation on the video frame to obtain a portrait image and a background image;
  a portrait image adjustment module configured to adjust transparency of pixels that meet a defined condition in the portrait image to obtain the adjusted portrait image;
  an entire background image obtaining module configured to process the background image to obtain an entire background image;
  a portrait video frame obtaining module configured to fuse the adjusted portrait image and the entire background image to obtain a portrait video frame; and
  a target video obtaining module configured to stitch a plurality of portrait video frames to obtain a target video.

According to at least one embodiment of the present disclosure, the embodiment of the present disclosure discloses an electronic device. The electronic device includes:
  at least one processing apparatus; and
  a storage apparatus configured to store at least one program, where
  the at least one program, when executed by the at least one processing apparatus, causes the at least one processing apparatus to implement the video generation method according to any one of the embodiments of the present disclosure.

According to at least one embodiment of the present disclosure, the embodiment of the present disclosure discloses a computer-readable medium having stored thereon a computer program that, when executed by a processing apparatus, causes the video generation method according to any one of the embodiments of the present disclosure to be implemented.

The invention claimed is:

1. A video generation method, comprising: obtaining a video frame contained in a video to be processed, wherein the video to be processed contains a portrait; performing portrait segmentation on the video frame to obtain a portrait image and a background image; adjusting transparency of pixels that meet a defined condition in the portrait image to obtain the adjusted portrait image; processing the background image to obtain an entire background image; fusing the adjusted portrait image and the entire background image to obtain a portrait video frame; and stitching a plurality of portrait video frames to obtain a target video;
  wherein adjusting the transparency of the pixels that meet the defined condition in the portrait image to obtain the adjusted portrait image comprises: making at least one copy of the portrait image to obtain at least one portrait image copy; rotating the at least one portrait image copy about a coordinate axis of a three-dimensional space by a set angle to obtain the rotated portrait image copy, wherein the portrait image and the at least one rotated portrait image copy form a portrait image group; and adjusting transparency of pixels that meet the defined condition in the portrait image group to obtain the adjusted portrait image group; and fusing the adjusted portrait image and the entire background image to obtain the portrait video frame comprises: fusing the adjusted portrait image group and the entire background image to obtain the portrait video frame;
  wherein after the adjusted portrait image group is obtained, the method further comprises: determining a rotation percentage for each pixel in the adjusted portrait image group based on a distance of the pixel from a center point of the video frame; determining a rotation parameter of the pixel based on the rotation percentage and the set rotation angle, wherein the set rotation angle is related to a moment of the video frame in the video to be processed; and rotating the pixel according to the rotation parameter;
  wherein determining the rotation parameter of the pixel based on the rotation percentage and the set rotation angle comprises: determining an intermediate rotation angle based on the rotation percentage and the set rotation angle; and using a sine value of the intermediate rotation angle as a first sub-rotation parameter, and a cosine value of the intermediate rotation angle as a second sub-rotation parameter; and rotating the pixel according to the rotation parameter comprises: determining coordinate information of the rotated pixel based on the first sub-rotation parameter and the second sub-rotation parameter.

2. The method according to claim 1, wherein performing portrait segmentation on the video frame to obtain the portrait image and the background image comprises:
  performing portrait recognition on each video frame to obtain a portrait mask image and a background mask image;
  obtaining the portrait image based on the portrait mask image and the video frame; and
  obtaining the background image based on the background mask image and the video frame.

3. The method according to claim 1, wherein after the adjusted portrait image group is obtained, the method further comprises: scaling at least one portrait image in the adjusted portrait image group by a set ratio to obtain the scaled portrait image group.

4. The method according to claim 1, wherein processing the background image to obtain the entire background image comprises:
  obtaining optical flow information of a background image of a first video frame of the video to be processed or a background image of a previous video frame of the video frame; and processing the optical flow information using a set inpainting algorithm, to obtain the entire background image of the video frame.

5. The method according to claim 1, wherein the defined condition is that a distance of pixels from a center point of the video frame is greater than or less than a set value; and the set value is related to a moment of the video frame in the video to be processed.

6. An electronic device, comprising: at least one processing apparatus; and a storage apparatus configured to store at least one program, wherein the at least one program, when executed by the at least one processing apparatus, causes the at least one processing apparatus to: obtain a video frame included in a video to be processed, wherein the video to be processed includes a portrait; perform portrait segmentation on the video frame to obtain a portrait image and a background image; adjust transparency of pixels that meet a defined condition in the portrait image to obtain the adjusted portrait image; process the background image to obtain an entire background image; fuse the adjusted portrait image and the entire background image to obtain a portrait video frame; and stitch a plurality of portrait video frames to obtain a target video;

wherein adjusting the transparency of the pixels that meet the defined condition in the portrait image to obtain the adjusted portrait image by: making at least one copy of the portrait image to obtain at least one portrait image copy; rotating the at least one portrait image copy about a coordinate axis of a three-dimensional space by a set angle to obtain the rotated portrait image copy, wherein the portrait image and the at least one rotated portrait image copy form a portrait image group; and adjusting transparency of pixels that meet the defined condition in the portrait image group to obtain the adjusted portrait image group; and fusing the adjusted portrait image and the entire background image to obtain the portrait video frame comprises: fusing the adjusted portrait image group and the entire background image to obtain the portrait video frame;

wherein after the adjusted portrait image group is obtained, the device is further caused to: determine a rotation percentage for each pixel in the adjusted portrait image group based on a distance of the pixel from a center point of the video frame; determine a rotation parameter of the pixel based on the rotation percentage and the set rotation angle, wherein the set rotation angle is related to a moment of the video frame in the video to be processed; and rotate the pixel according to the rotation parameter;

wherein determining the rotation parameter of the pixel based on the rotation percentage and the set rotation angle by: determining an intermediate rotation angle based on the rotation percentage and the set rotation angle; and using a sine value of the intermediate rotation angle as a first sub-rotation parameter, and a cosine value of the intermediate rotation angle as a second sub-rotation parameter; and wherein the device is caused to rotate the pixel according to the rotation parameter by determining coordinate information of the rotated pixel based on the first sub-rotation parameter and the second sub-rotation parameter.

7. The device according to claim 6, wherein the device is further caused to perform portrait segmentation on the video frame to obtain the portrait image and the background image by:

perform portrait recognition on each video frame to obtain a portrait mask image and a background mask image;

obtain the portrait image based on the portrait mask image and the video frame; and obtain the background image based on the background mask image and the video frame.

8. The device according to claim 6, wherein after the adjusted portrait image group is obtained, the device is further caused to: scale at least one portrait image in the adjusted portrait image group by a set ratio to obtain the scaled portrait image group.

9. The device according to claim 6, wherein the device is further caused to process the background image to obtain the entire background image by:

obtaining optical flow information of a background image of a first video frame of the video to be processed or a background image of a previous video frame of the video frame; and processing the optical flow information using a set inpainting algorithm, to obtain the entire background image of the video frame.

10. The device according to claim 6, wherein the defined condition is that a distance of pixels from a center point of the video frame is greater than or less than a set value, and the set value is related to a moment of the video frame in the video to be processed.

11. A non-transitory computer-readable medium having stored thereon a computer program that, when executed by a processing apparatus, causes the processing apparatus to: obtain a video frame included in a video to be processed, wherein the video to be processed includes a portrait; perform portrait segmentation on the video frame to obtain a portrait image and a background image; adjust transparency of pixels that meet a defined condition in the portrait image to obtain the adjusted portrait image; process the background image to obtain an entire background image; fuse the adjusted portrait image and the entire background image to obtain a portrait video frame; and stitch a plurality of portrait video frames to obtain a target video;

wherein the processing apparatus is further caused to adjust the transparency of the pixels that meet the defined condition in the portrait image to obtain the adjusted portrait image by: making at least one copy of the portrait image to obtain at least one portrait image copy; rotating the at least one portrait image copy about a coordinate axis of a three-dimensional space by a set angle to obtain the rotated portrait image copy, wherein the portrait image and the at least one rotated portrait image copy form a portrait image group; and adjusting transparency of pixels that meet the defined condition in the portrait image group to obtain the adjusted portrait image group; and wherein the processing apparatus is caused to fuse the adjusted portrait image and the entire background image to obtain the portrait video frame by fusing the adjusted portrait image group and the entire background image to obtain the portrait video frame;

wherein after the adjusted portrait image group is obtained, the processing apparatus is further caused to: determine a rotation percentage for each pixel in the adjusted portrait image group based on a distance of the pixel from a center point of the video frame; determine a rotation parameter of the pixel based on the rotation percentage and the set rotation angle, wherein the set rotation angle is related to a moment of the video frame in the video to be processed; and rotate the pixel according to the rotation parameter;

wherein the processing apparatus is further caused to: determine the rotation parameter of the pixel based on the rotation percentage and the set rotation angle comprises: determine an intermediate rotation angle based on the rotation percentage and the set rotation angle; and use a sine value of the intermediate rotation angle as a first sub-rotation parameter, and a cosine value of the intermediate rotation angle as a second sub-rotation parameter; and rotating the pixel according to the rotation parameter comprises: determining coordinate information of the rotated pixel based on the first sub-rotation parameter and the second sub-rotation parameter.

12. The computer-readable medium according to claim 11, wherein the processing apparatus is further caused to perform portrait segmentation on the video frame to obtain the portrait image and the background image by:
performing portrait recognition on each video frame to obtain a portrait mask image and a background mask image;
obtaining the portrait image based on the portrait mask image and the video frame; and
obtaining the background image based on the background mask image and the video frame.

\* \* \* \* \*